Sept. 4, 1962     L. J. DI VITO     3,052,770
ELECTRICAL CONNECTOR
Filed July 12, 1960

INVENTOR
Louis J. Di Vito

BY *Lewis H. Lanman*
ATTORNEY 3,052,770
ELECTRICAL CONNECTOR
Louis J. Di Vito, Florida Bldg., Apt. 2, Parklynn Apts., Elsmere, Wilmington 5, Del.
Filed July 12, 1960, Ser. No. 42,267
4 Claims. (Cl. 200—51.09)

My invention relates to an improved electrical connector of the jack and plug type. More particularly, it is an improvement in electrical connectors for quick coupling of a sensitive measuring instrument, such as a millivoltmeter, to a sensing or detecting device which generates a flow of current in response to its environment, for example, a thermoelectric pyrometer.

Thermocouples and other like detecting instruments are standardly made with lead wires terminating in a plug, and the measuring instrument circuit to which it is coupled carries a two pin jack to receive the plug. This two component connector provides a means for quickly connecting and disconnecting the device from the measuring circuit. This gives the pyrometer or other detecting device more mobility. It can be carried from one location to another uncoupled from the measuring circuit. However, when the plug is disconnected from the jack the measuring circuit is opened and the measuring instrument needle swings freely, or drives to either end of the scale, depending upon the internal wiring of the instrument. Such a condition occurring repeatedly is damaging to the instrument and shortens its useful life.

My invention provides an improved jack by which this difficulty is circumvented. The jack is provided with a movable contact means operable upon disconnecting the plug to hold the measuring instrument circuit closed by automatically short circuiting it through the jack. Upon insertion of the plug, the contact means is operable to close the primary instrument circuit to the thermocouple, and the auxiliary or short circuit through the jack is opened.

Figure 2:
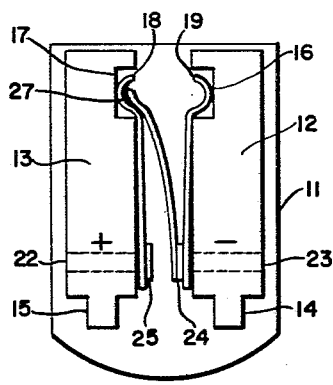
Figure 3:
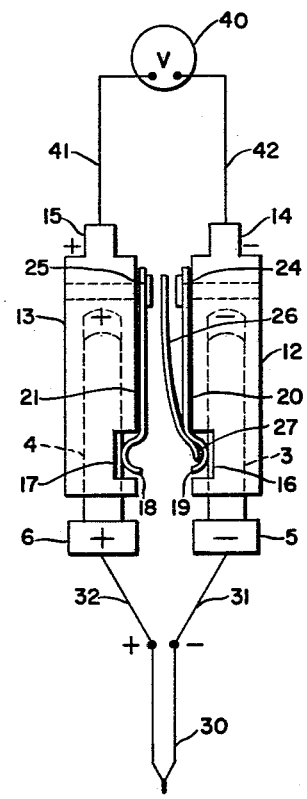

The invention is described in greater detail in conjunction with its illustration in the accompanying drawings. There it is shown in its application to thermoelectric pyrometer circuitry. However, it will be recognized by those skilled in the art that it has application to any jack and plug type connector for measuring circuits having delicate instruments where the advantage of quick uncoupling needs the counter advantage of means to protect the instrument. The drawings show a presently preferred embodiment, but the invention is not be regarded as limited thereto, in which FIGURE 1 is a schematic view of the improved jack with the top of the housing removed and the operating parts exposed with the plug inserted, showing the closed circuit position of the jack and plug, and the short circuiting contact means in open circuit position, FIGURE 2 is the same schematic view of the jack as in FIGURE 1 with the plug removed, showing the short circuiting contact means in closed circuit position, and FIGURE 3 is a schematic view showing the complete circuitry, including a thermocouple, the jack and plug connector and the measuring instrument with the primary circuit closed and the short circuit open.

Figure 1:
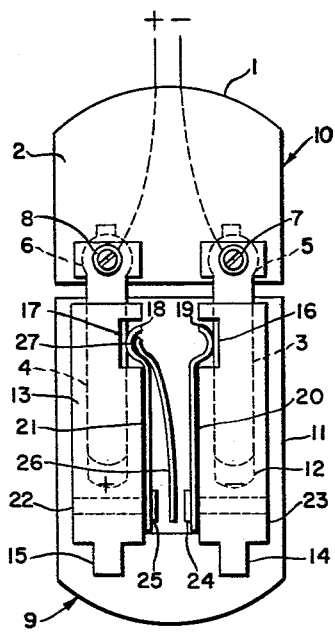

Referring to FIGURE 1, a plug 10 is provided with a suitable non-conducting housing 1, preferably made in two parts, a top 2 being detachably united with a matching bottom (not shown). Secured to the plug housing are two pins 3 and 4, their bases 5 and 6 forming screw threaded hollow lead wire posts in which countersunk clamping screws 7 and 8 are seated. The thermocouple (see FIGURE 3) lead wires are connected through the plug housing at posts 5 and 6.

The jack 9 is also provided with a suitable non-conducting housing 11 which is preferably of detachable two part construction similar to the plug. Two female or hollow pin-receiving conducting elements or sockets 12 and 13 are mounted in the housing and carry lead wire connecting posts 14 and 15 to which the lead wires of the measuring circuit may be soldered, or otherwise suitably electrically connected. The pin receiving elements are provided near the open end of housing 11 with cut out portions 16 and 17 which receive movable hooked ends or prongs 18 and 19 of pin holding clips 20 and 21 which are made of flat spring metal. The clips are attached to the opposing sides of the pin-receiving elements 12 and 13 by means of pins 22 and 23 provided with flat contact heads 24 and 25. The prongs of the clips are positioned to frictionally grip the plug pins when they are inserted in the jack. A movable contact strip 26 is carried by one of the clip prongs, as shown at 27. The free end of contact strip 26 is located in contact-making position with respect to contact 24.

The electrical parts of the jack and plug are polarized and are made of conventional or standard matched thermocouple material, for example, iron-constantin, copper-constantin, or Chromal-Alumal. The lead wires in the pyrometer and millivoltmeter are also of the same matched thermocouple material.

Referring to FIGURE 3, an iron-constantin thermocouple 30 is shown connected to posts 5 and 6 of pins 3 and 4, respectively through lead wires 31 (constantin) and 32 (iron). A millivoltmeter 40 is connected to the jack 9 with an iron lead wire 41 to the positive and constantin lead wire 42. The thermocouple and measuring instrument are shown in closed circuit position with the plug and jack coupled. Note in FIGURE 3, the contact strip 26 is reversed. It is secured at 27 to the pin holding clip 20 on the negative terminal 12 of the jack, and its free end makes contact with contact 25 on the positive terminal 21.

As may be seen from FIGURES 1 and 3, when the plug pins are inserted to couple the pyrometer to the measuring circuit, the prongs of the pin holding clips are forced outwardly from the recesses in the pin-receiving elements by the pins. This movement causes the strip contact 26 to move out of contact with contact 24, and no condition of short circuit can occur in the jack between the positive and negative sides of the measuring circuit. Thus, the thermocouple is directly connected to the measuring circuit. However, as shown in FIGURE 2 when the plug pins are removed from the jack to disconnect the thermocouple from the measuring circuit, the prongs of the pin holding clips move back into the recesses in the pin-receiving elements and contact strip 26 engages contact 24. Thus, the jack automatically short circuits. This holds the measuring circuit closed and the millivoltmeter records the temperature of the jack connected to the lead wires of the instrument. In this manner, the needle of the instrument cannot swing freely or drive to one end of the scale as in conventional jack and plug connectors where the measuring circuit is opened upon disconnecting the plug.

In my invention, the particular shape of the plug pins may be varied from cylindrical to flat or angular, it being necessary only for the pins to move the holding clip prongs to operate the short-circuiting contact strip. Various other modifications may be made to the improved jack without departing from the invention as set forth in the appended claims.

I claim:
1. In a jack and plug connector, a plug having contact pins and a jack having pin-receiving elements, the improvement which comprises a pin holding clip having a free end projecting in pin-contacting position into a recess in the wall of a pin-receiving element, said clip being electrically connected to said element and its projecting end being movable outwardly in said recess upon insertion of a plug pin into said element, and a contact strip member fixed to the projecting end of said pin holding clip, said contact strip having a free end located in contact-making position with respect to the other of said pin-receiving elements and movable into engagement with said other pin-receiving element upon removal of the plug pins, and movable out of engagement with said other pin-receiving element upon insertion of said plug.

2. An automatic short-circuiting jack for a jack and plug connector comprising hollow plug pin-receiving elements, pin holding members electrically connected to each of said pin-receiving elements and having their free ends projecting in pin-contacting position into recesses in the walls of said pin-receiving elements, the free ends of said members being movable outwardly in said recesses upon insertion of plug pins into the pin-receiving elements, a contact strip member carried by the free end of one of the pin holding members, said contact strip member having a free end movable into electrical contact with the other pin holding member when the plug is removed from the jack, and movable out of contact with the other pin holding member when the jack and plug are coupled.

3. A jack and plug connector for coupling thermocouples with a measuring circuit and having a short-circuiting device in said jack for maintaining the measuring circuit closed when the thermocouple is disconnected, which comprises a plug with contact pins, a jack having pin-receiving sockets, pin holding clips on said sockets and electrically connected thereto having free ends projecting into recesses in the walls of said sockets and movable upon insertion and withdrawal of the plug pins into and from the sockets, and a contact strip member carried by the free end of one of said clips and itself having a free end movable therewith into and out of engagement with the other clip upon removal and insertion of the plug pins.

4. An automatic short-circuiting jack for a jack and plug connector comprising plug pin-receiving elements, pin holding members electrically connected to opposing sides of said pin-receiving elements and movable upon insertion and removal of plug pins, and contact means carried by one of said pin holding members and positioned between the said members movable into closed circuit position with the other of said members upon removal of plug pins from the jack, and movable into open circuit position upon insertion of plug pins into the jack.

References Cited in the file of this patent

UNITED STATES PATENTS 2,312,002     Schmitt _____ Feb. 23, 1943

FOREIGN PATENTS 482,288     Great Britain _____ Mar. 25, 1938